ary Examiner—J. Karl Bell

United States Patent [19]
Bentley

[11] 3,969,860
[45] July 20, 1976

[54] THERMAL EFFICIENCY STRUCTURE

[76] Inventor: Richard Paul Bentley, Mount Arab, N.Y. 12986

[22] Filed: July 31, 1974

[21] Appl. No.: 493,616

[52] U.S. Cl. .................................. 52/261; 52/404
[51] Int. Cl.² .................... E04B 1/00; E04B 1/74
[58] Field of Search ............................. 52/261, 404

[56] References Cited
UNITED STATES PATENTS

| | | | |
|---|---|---|---|
| 3,462,897 | 8/1969 | Weinrott | 52/615 X |
| 3,500,596 | 3/1970 | Andersson | 52/404 X |
| 3,540,177 | 11/1970 | Slining | 52/261 |
| 3,603,060 | 9/1971 | Kay | 52/404 |
| 3,694,986 | 10/1972 | Yamamoto et al. | 52/404 |
| 3,862,700 | 1/1975 | Noma et al. | 52/404 |

Primary Examiner—J. Karl Bell

[57] ABSTRACT

The thermal efficiency structure herein disclosed has a unique insulated double wall construction in which there is a minimum of connecting elements between interior and exterior wall surfaces and in which all surface components form lap joints with underlying structure, combined with extensive use of adhesives, such that both interior and exterior wall surfaces are air and moisture proof. Generally, a ventilation system containing a counterflow heat exchanger for recovery of ventilation thermal losses is an integral part of this structure.

1 Claim, 7 Drawing Figures

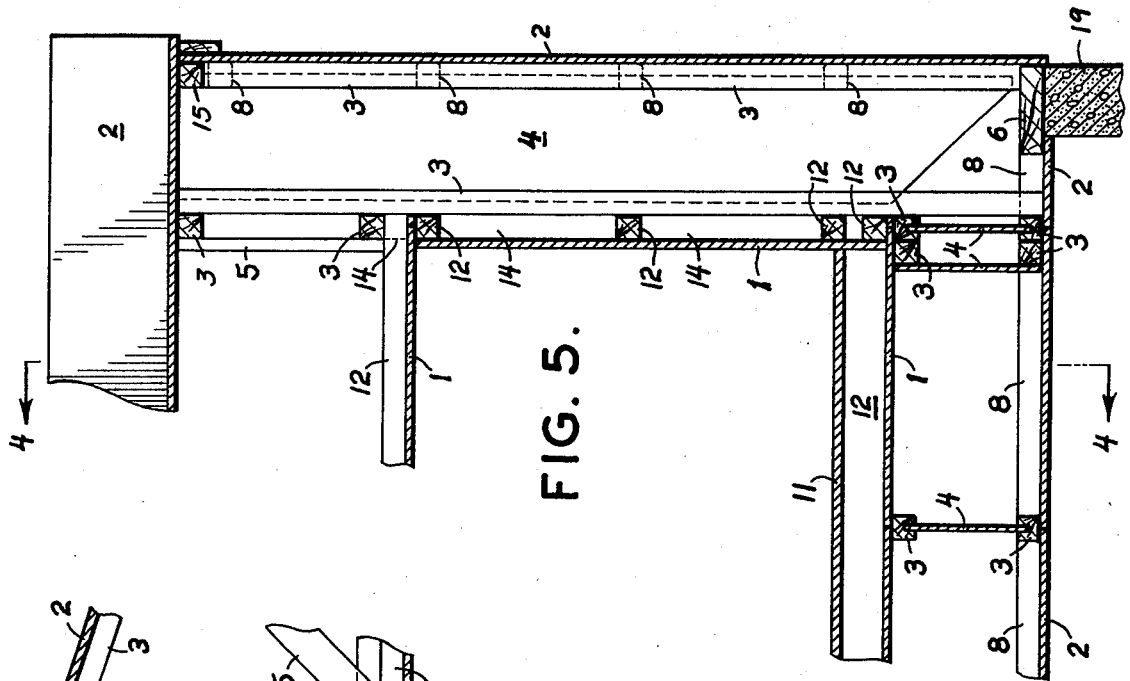
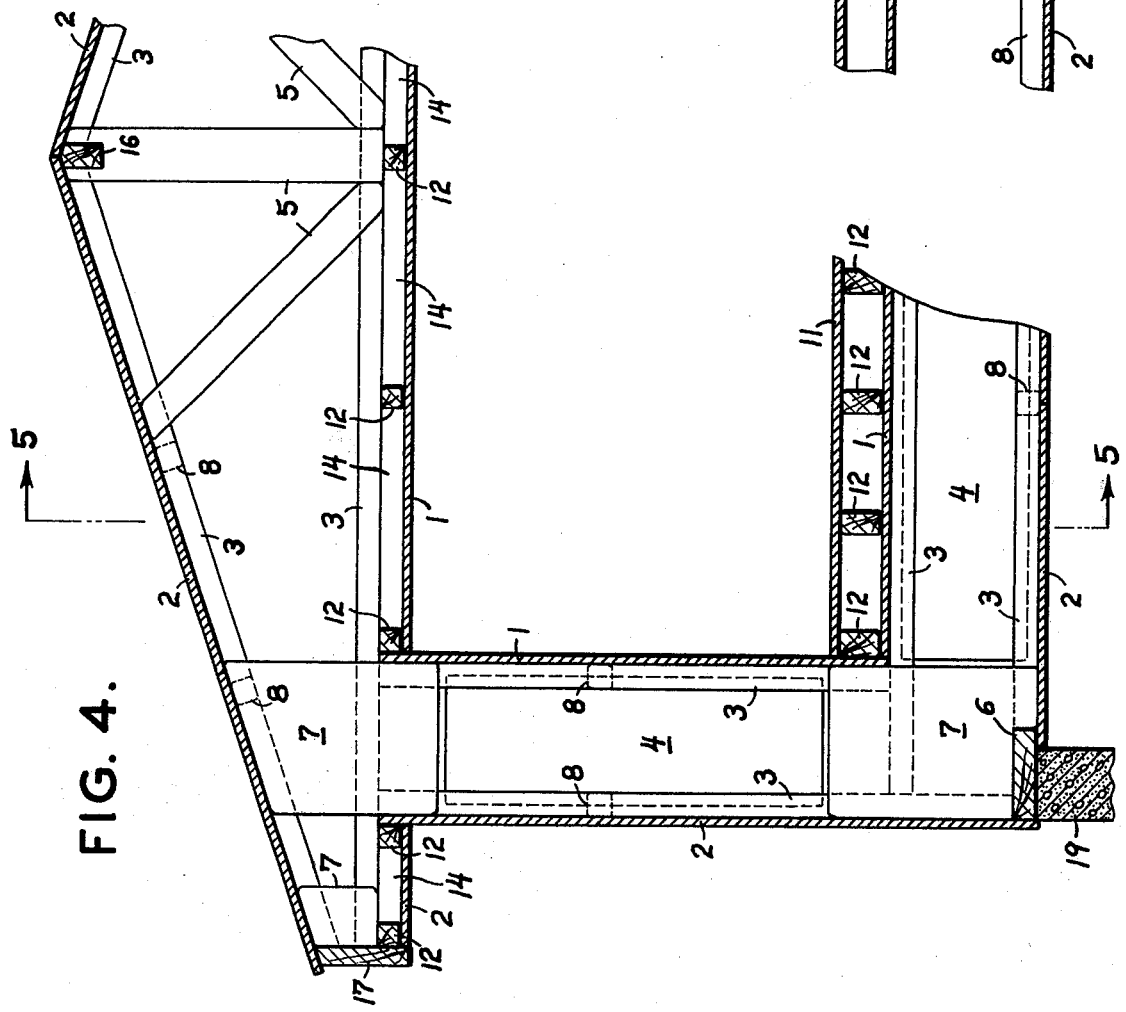

THERMAL EFFICIENCY STRUCTURE

The present invention relates to a new and useful method of thermal efficiency construction which has considerable advantages over conventional building construction, notably in the area of energy conservation. Approximately one fourth of the United States energy budget is used for space heating and cooling. Many factors influence the degree to which a thermal efficiency structure can conserve heat energy. Under optimum circumstances a thermal efficiency structure, compared to a conventional structure of equivalent size, shape, cost, and location, should effect a reduction in the space heating energy requirement of more than 85 percent.

The primary object of this invention is to provide a thermal efficiency structure with a heating and cooling requirement significantly less than conventional structures. This object is accomplished by the reduction of conduction and ventilation losses through the use of very thick, insulated, airtight walls and a counterflow heat exchanger in the ventilation system.

Another important object of this invention is to provide a thermal efficiency structure which is economically competitive with conventional structures. The present invention makes it possible to construct the necessary thick, insulated, airtight wall, floor, and ceiling surfaces using no more, and in some cases less, material and labor than required for conventional building construction with the exception of additional insulation and heat exchanger. The cost of additional insulation and heat exchanger is more than offset by the reduction in capital expenditure for heating system components and fuel costs.

A further object of this invention is to provide a thermal efficiency structure which may be built using conventional materials and construction tools. The materials most easily and least expensively employed for thermal efficiency construction are common wood products such as structural lumber and panels of plywood, hardboard, and other types of composition board. There is extensive use of construction adhesives and ordinary construction tools such as hammers and wood saws are used for assembly.

An understanding of this invention may be had from the following description, taken in connection with the accompanying drawings, in which:

FIG. 4 is an elevation view through an enlarged vertical section taken along line 4—4 of FIG. 1 in which dotted lines indicate hidden parts;

FIG. 5 is an elevation view through an enlarged vertical section taken along line 5—5 of FIG. 1 in which dotted lines indicate hidden parts;

GENERAL STRUCTURE

Figure 1:
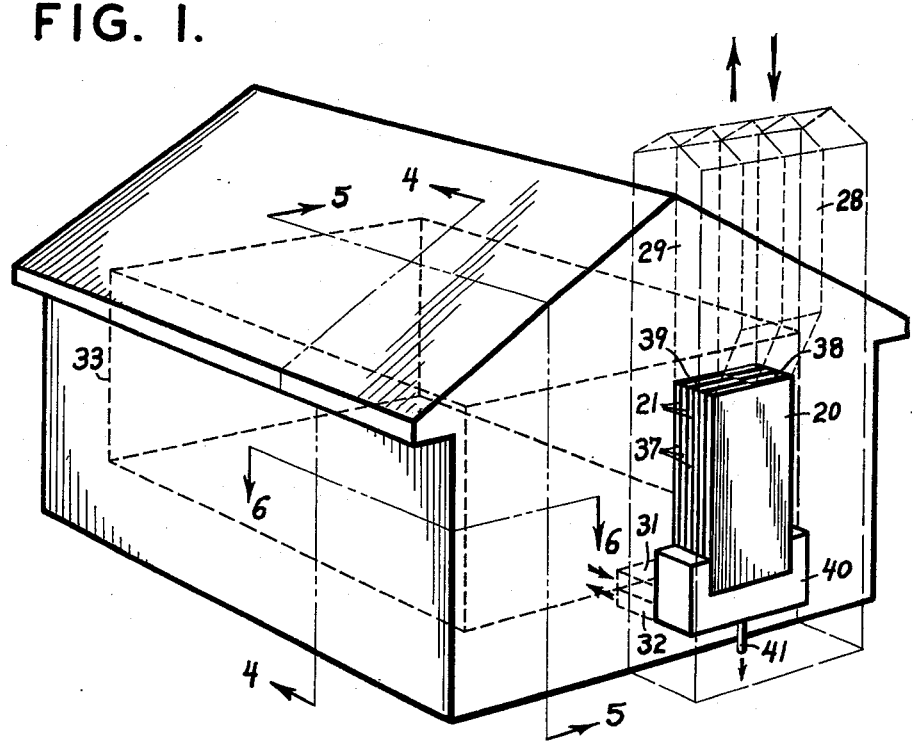
FIG. 1 is a perspective view of a thermal efficiency structure, in outline, in which dotted lines indicate hidden parts and dashed lines indicate enclosing structure not shown so that interior details may be illustrated more clearly.

Interior 1 and exterior 2 surfaces in thermal efficiency structures are panels of plywood, hardboard, and other forms of composition board manufactured from wood, plastic, mineral substance, and combinations of these and other materials that produce a panel which will provide an effective barrier to the passage of air and water vapor. Generally the panels procured for use in thermal efficiency construction are of uniform dimensions and rectangular in shape. Uniform panels minimize labor and waste of material during construction. Rectangular panels of many materials, commonly 4 feet wide by 8 feet long as well as other sizes, are widely available in the United States and elsewhere.

An essential feature of thermal efficiency construction, shown in FIGS. 3–7, is the method of providing mechanically strong, airtight lap joints between the entire perimeter of each surface panel and adjacent structure. A lap joint consists of a bond made on the panel surface, generally near the panel edges. These lap joints, which involve adjacent surface panels glued and nailed to a common supporting structure member or adjacent surface panels glued and nailed to each other, are continuous over the entire interior and exterior surface and across the edge of door, window, and other openings connecting interior and exterior surfaces.

In rectilinear and other construction using plane surfaces for wall, floor, and roof elements, the basic building blocks of most architecture, there is a requirement to connect interior and exterior surfaces to provide structural strength and rigidity. The connecting structure, necessary in thermal efficiency construction, between the load carrying interior surface 1 and exterior surface 2 consists of built-up beams composed of two structural lumber edge members 3 and a connecting panel 4 of thin plywood or composition board. The connecting panel 4 may be continuous along the length of the built-up beam or there may be openings or spaces in the connecting panel 4 depending on the strength requirement for a particular built-up beam. The preferred form of built-up beam is shown in cross section as TYPE I in FIG. 6 and is generally used for illustration in FIGS. 4–7. TYPE I consists of a single connecting panel 4 glued, along its opposite edges, into corresponding slots cut into the facing sides of the two edge members 3. The required slot in each edge member 3 may be easily cut with a table saw or other woodworking equipment.

Figure 7:
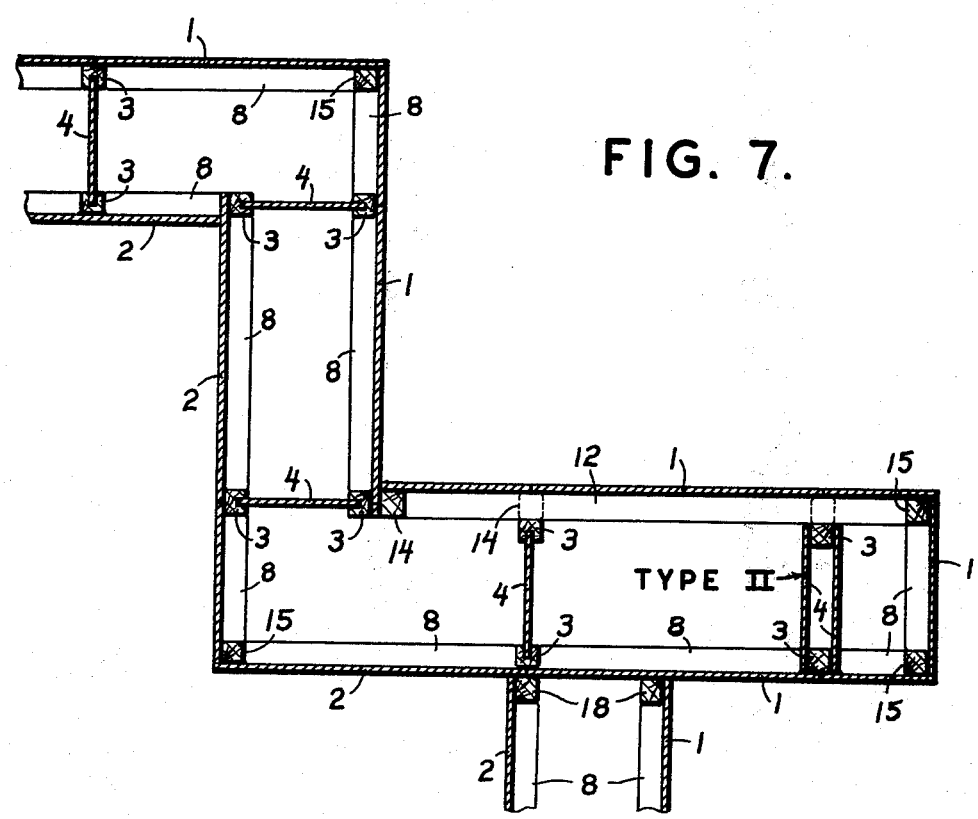
FIG. 7 is an elevation view through an enlarged horizontal section similar to FIG. 6 but illustrating features not included in FIG. 1 and in which dotted lines indicate hidden parts.

Another form of built up beam, which requires no slotting and has greater strength but requires more material, is shown in cross section as TYPE II in FIG. 7. TYPE II consists of two connecting panels 4 glued to opposite sides of the two edge members 3 forming a built-up beam with a rectangular cross section.

The built-up beam may also be a conventional truss using structural lumber bridging 5 rather than a connecting panel. This method, shown in FIG. 4, is recommended for the truss between ceiling surface 1 and roof surface 2.

Built-up beams for side walls, floor, and roof are joined to form a frame in the shape of a cross section of the building at the location where the frame will be installed. Consecutive frames are spaced on the building plate 6 at points coincident with the joints between surface panels. These points are usually spaced at a distance equal to a standard panel width that will allow application of standard sized interior 1 and exterior 2 surface panels without cutting except to length. Additional built-up beams which are not part of a complete frame may be used between frames in areas, such as floors, that require additional strength. FIG. 4, a vertical section of a building, shows in plan view the important portions of a typical frame composed of built-up beams. The individual beams for walls, floor, and roof are joined using gussets 7 of thin plywood, composition board, or other suitable material glued and nailed to one or both sides of the built-up beam juncture.

Figure 3:
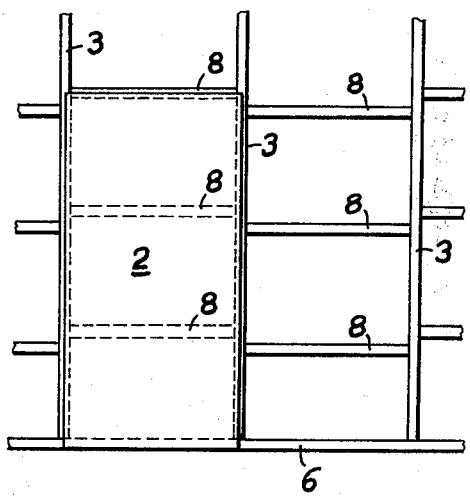
FIG. 3 is a side elevation view of surface support structure used for mounting portions of interior and exterior surface paneling in which dotted lines indicate hidden parts.

FIG. 3 shows a typical section of surface support structure employing structural lumber spacers 8 nailed between edge members 3 of adjacent frames for mounting and reinforcing surface panels. Spacers 8 are used for both interior and exterior surfaces and together with the edge members 3 form a generally rectangular grid-like interior and exterior surface supporting structure. Spacers 8 and edge members 3 form a rectangular surface to which the entire perimeter of a surface panel 1 or 2 may be glued and nailed. Additional spacers 8 are used where necessary to impart rigidity to the central portions of a surface panel. It is generally not necessary that spacers 8, in adjacent between frames, be exactly aligned on opposite sides of an edge member 3 and their attachment to the edge member 3 may be offset to facilitate assembly.

Floors 11 usually require additional support in the form of floor laths 12 spaced close together and nailed on top of and perpendicular to the built-up beams in the floor. FIG. 4 shows the installation of floor laths 12 in cross section. A similar system of laths may be used in other locations such as is demonstrated by the ceiling in FIGS. 4 and 5 and by the interior end walls in FIGS. 5 and 6. The ceiling and end wall laths 12 are used mainly for the purpose of easier construction, particularly with regard to forming an air tight junction of interior side wall surface panels to ceiling surface panels and interior end wall surface panels. Surfaces where laths 12 are used eliminate the need for spacers 8 but require the use of filler pieces 14 attached along the length of edge members 3 between adjacent laths 12 at intervals corresponding to the ends of the surface panels. The filler pieces 14 and laths 12 form a rectangular surface to which the entire perimeter of a surface panel may be glued and nailed.

Whenever laths 12 are used the airtight surface of plywood, composition board, or other suitable material may be laid on top of the built-up beams followed by laths 12. FIGS. 4 and 5 illustrate placement of the airtight interior floor surface 1 between the built-up beam edge members 3 and the floor laths 12. The panels of this interior surface 1 should be aligned such that one set of parallel edges on each panel may be glued and nailed to the built-up beam edge members 3 and the perpendicular set of parallel edges may be glued and nailed, from the opposite side, to the laths 12. The enclosed space thus formed between the interior surface 1 and the finished floor 11, ceiling, or wall surface may be used for air ducts or utility ducts. The interior surface 1 makes it possible to apply a floor 11 or other surface that is not airtight, such as a hardwood floor or ceiling tiles, without the need of an adjacent underlying airtight paneled surface and without the need of filler pieces 14.

Figure 6:
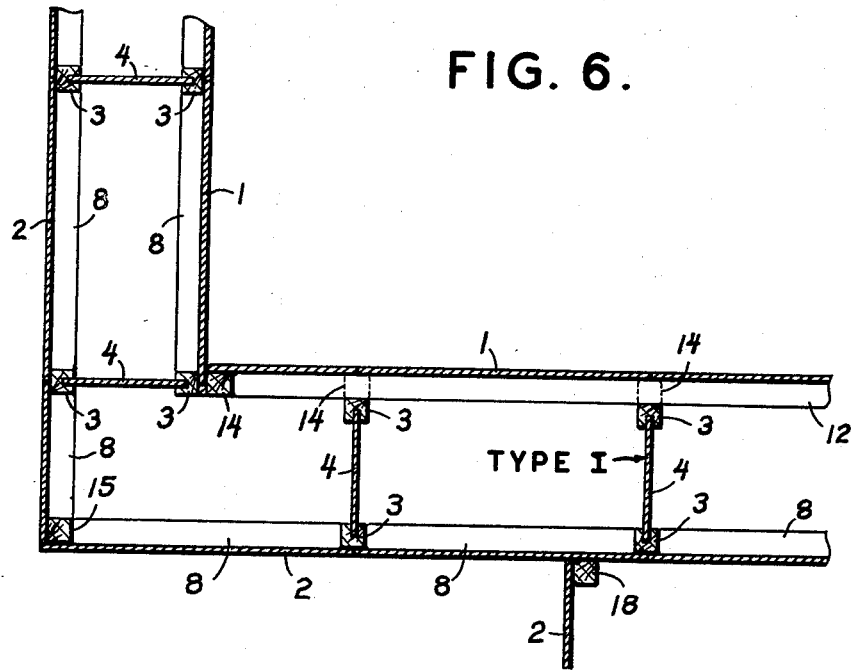
FIG. 6 is an elevation view through an enlarged horizontal section taken along line 6—6 of FIG. 1 in which dotted lines indicate hidden parts.

End wall surfaces, parallel to the frames, are illustrated in FIGS. 5–7. These walls are constructed using built-up beams, generally placed vertically against the last frame at each end of the structure. Spacers 8 are used between the built-up beams for the exterior surface 2 and laths 12 and filler pieces 14 are used for the interior end wall surface 1. Corner members 15, shown in FIGS. 6 and 7, a ridge member 16, and eave members 17, shown in FIG. 4, complete the surface supporting structure of the illustrated embodiment.

FIG. 6 includes an illustration of the means of attaching an airtight exterior structure such as might be used for enclosing the heat exchanger 20 shown in FIG. 1. A framing member 18 is glued and nailed to the exterior wall, preferably at a point opposite a built-up beam. Exterior surfacing 2 and additional supporting structure, as needed, is glued and nailed to the framing member 18.

FIG. 7 illustrates a number of wall configurations such as joining walls and the termination of a wall such as would be the case around openings like doors and windows.

The space between interior 1 and exterior 2 surfaces is filled with a thermal insulating material. This space may be vented to the outside, or not, depending on the permeability to moisture of the surface paneling used, the type of insulation used, and the climatic conditions to which the structure will be exposed.

Wiring, plumbing, and other utility lines passing through interior and exterior wall surfaces are sealed to the surfaces at the point of penetration with a flexible sealant. Construction features such as foundations 19, shown in FIGS. 4 and 5, roof surfaces which are placed on top of the airtight roof paneling, and interior and exterior floor, ceiling, and wall surfacing materials, if separate from the airtight surface paneling, may be used in accordance with conventional practice.

Ventilation System

Proper ventilation of an enclosed space is necessary for occupant health and comfort. When outside air is brought into a structure at outside temperature and vented to the outside at room temperature a significant amount of heat must be provided, by a furnace or other means, to maintain the inside temperature, particularly in northern climates where outside winter temperatures can be considerably lower than the desired room temperature. Tests on full scale, conventionally insulated residential structures indicate that ventilation heat losses can account for up to 40 percent of the total building heat requirement.

Figure 2:
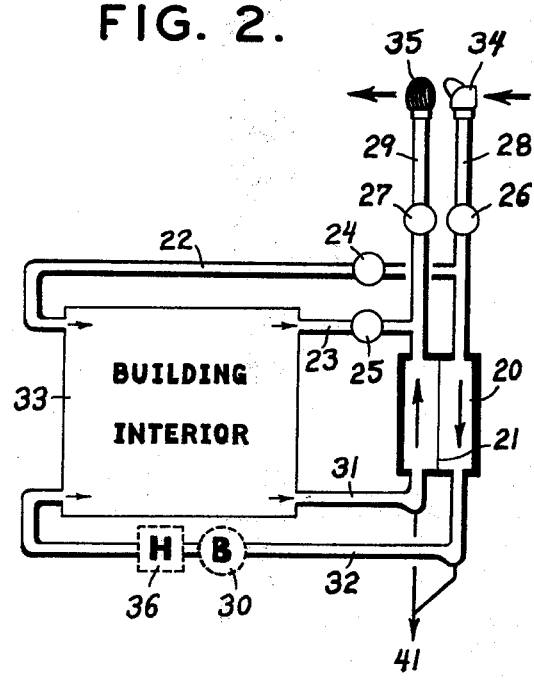
FIG. 2 is a ventilation system diagram which contains all elements necessary for proper ventilation of a thermal efficiency structure.

Structures built using thermal efficiency construction or other airtight construction make possible the use of a closed loop ventilation system as shown in FIG. 2 in which incoming air may be warmed by the outgoing air in a counterflow heat exchanger 20. The system is called a closed loop ventilation system because interior heat passes through the outlet duct 31 to the counterflow heat exchanger 20, through the heat exchanger baffles 21, and then back through the inlet duct 32 to the building interior 33. A counterflow heat exchanger consists of one or more outgoing air passages separated from one or more incoming air passages by a thin, thermally conductive baffle 21 with air flow on the two sides of a baffle member 21 moving in opposite directions to each other. A counterflow heat exchanger 20, as illustrated in FIG. 1 and shown in diagrammatic form in FIG. 2, is capable of transferring a very high percentage of heat from one air flow to the other. The system works with equal efficiency, to save energy, when the interior of a structure is cooled to a temperature below outside air temperature, such as when an air conditioner is used.

The structure served by this closed loop ventilation system must be airtight because air infiltrating in or out of the house by means other than the ventilation system constitutes a direct loss of energy. Windows of the double glass type and which cannot be opened should be used, tightly sealed to the surrounding wall. Outside doors in thermal efficiency structures should be insulated and fit snugly against a weathertight seal around the entire closing surface.

A closed loop ventilation system employing a counterflow heat exchanger 20 must also be provided with at least one, and preferably two, heat exchanger bypass ducts 22 and 23 which are used when the full capability of the counterflow heat exchanger is not required to maintain the desired room temperature. Air flow through the by-pass ducts is controlled by a damper 24 on the inlet by-pass duct 22 and a damper 25 on the outlet by-pass duct 23. Dampers 26 and 27 in the ventilation system main inlet 28 and outlet 29 ducts, positioned above the counterflow heat exchanger 20 in FIG. 1, are used to control total air flow through the ventilation system. Air flow through the ventilation system may be driven by a blower 30 located in the inlet duct 32 between heat exchanger 20 and the building interior 33. Air flow may also be driven by natural forces such as wind action on appropriately designed inlet 34 and outlet 35 vents and by convection, or by a combination of blower and natural forces, the choice being based on climatic conditions and design requirements.

A heating system 36 may be combined with the closed loop ventilation system in which case it should heat air passing through inlet duct 32 and the heating system may contain the blower 30. Automatic thermostatic controls may be used to operate the various dampers, blower, and heating unit. A thermal efficiency house may be heated by any conventional means by very effectively by any of the various solar heating methods. Windows fitted with insulated window shutters which may be opened during the day to admit heat and light and closed on cold nights, can provide and retain a considerable portion of the house heating requirement.

The counterflow heat exchanger 20 should be designed so that condensation, which will form in the outlet portions, can easily flow, by gravity, to a drainage point 41. The inlet air passages of the heat exchanger should also be provided with a drain 41. Outlet air flow in the heat exchanger 20 should be upward so that the condensation flow will be away from the end of the counterflow heat exchanger which is at the temperature of outside air. This design feature is critical because when outside temperature goes below the freezing point of water (0°C.), condensation will freeze to the baffles 21 in the portion of the heat exchanger where the temperature is 0°C. or less. This accumulation of ice will tend to block the outlet air flow and reduce the transfer of heat across the baffles so at necessary time intervals the heat exchanger must be defrosted to remove the ice. The easiest way contemplated to accomplish defrosting is to temporarily close dampers 26 and 27 in the main inlet 28 and outlet 29 ducts, open the inlet by-pass damper 22, and operate the blower 30 to circulate warm inside air through the inlet portions of the heat exchanger 20. This will quickly melt the ice free from the baffles and allow it to drop down into the warm portion of the heat exchanger where rapid melting and drainage of the condensate will occur. It is important that the coldest portion of the heat exchanger 20 be positioned at the top and that the air passages within the heat exchanger are unobstructed.

The heat exchanger may also be defrosted by circulating warm air directly through the outlet passages of the counterflow heat exchanger or through both inlet and outlet air passages. Other means of defrosting include the use of electric resistance elements, hot water lines, or steam lines affixed to the baffles 21. Other warm fluids may also be used for defrosting.

FIG. 1 illustrates a counterflow heat exchanger 20 with baffles 21 consisting of flat metal sheets sandwiched between baffle spacers 37. The baffle spacers 37 are positioned around the edges of the baffle sheets, except at those locations left open for inlet and outlet air flow to and from the heat exchanger. The top inlet 38 and outlet 39 heat exchanger air passage openings are shown in FIG. 1. A duct header 40 is shown at the bottom of the counterflow heat exchanger 20. The duct header 40 conducts inlet and outlet air flows between the bottom of the heat exchanger 20 and inlet and outlet ducts 31 and 32. The duct header 40 also contains a drip pan and drain 41 positioned below the bottom outlet air passage openings. The bottom inlet air flow passage baffle spacers contain small drain holes positioned above the drip pan which allow drainage of any water that gains entry to the inlet air flow passages of the heat exchanger.

Ventilation ducts throughout the ventilation system must be constructed so as to be airtight. Construction using the materials and methods demonstrated in thermal efficiency construction is highly suitable to this purpose. Other materials and forms of construction which will provide airtight ducts may also be used.

Thermal efficiency structures are not confined to any particular group or category of architectural shapes. The drawings illustrate preferred embodiments of the present invention and the principles thereof and what are considered to be the best modes contemplated for applying these principles. Other embodiments of the invention employing the same or equivalent principles may be used and structural variations may be made as desired by those skilled in the art without departing from the present invention and the purview of the appended claims.

I claim:

1. A thermal efficiency structure with interior and exterior surfaces consisting of airtight, moisture proof, structural panels, said surfaces spaced apart from each other with built-up beams, said beams comprising the only internal structural connection between interior and exterior surfaces with such connection between interior and exterior surfaces being required to provide structural strength and rigidity, and said beams composed of two edge members attached to, and held apart from each other, by at least one connecting panel or by bridging members, said beams arranged in a series of frames standing vertically on the building plate, each frame usually consisting of one floor beam, two side wall beams, and one roof beam assembled together into the configuration of a cross section of the structure and said beams in each frame connected to each other with gussets, said frames spaced parallel to each other along the length of the structure at intervals coincident with the interior and exterior surface panel joints, end walls for said structure consisting of vertically positioned beams resting at their lower end on the building plate and attached to the last frame at each end of the structure, said last frames being set in from the end of the building a distance equal to the width of the vertical end wall beams, said end wall beams arranged parallel to each other at intervals coincident with the interior and exterior surface panel joints, said interior and exterior surface panels further supported and reinforced with a system of spacers or laths, aligned generally parallel to each other and perpendicular to the built-up beams, and immediately adjacent to the surface paneling in walls, floor, ceiling, and roof at intervals necessary to impart rigidity to the surface panels and at all parallel surface panel joints, said surface panel joints throughout the entire structure located on and joined to built-up beams, spacers, laths, corner members, building plate, ridge, eave members, or filler pieces such that all said joints constitute airtight lap joints, said surface panel lap joints at all corner joints specifically including side wall to end wall joints, wall to ceiling joints, wall to floor joints, wall to roof eave joints, roof eave to roof surface joints, and roof surface to roof surface ridge joints being made through the attachment of the two joined panel surfaces to a single structural member consisting of a lath member, building plate member, eave member, ridge member, or corner member, said lap joints being made using nails and an airtight adhesive bond, said surface paneling and mechanically strong airtight lap joints being continuous over the entire structure interior and exterior surface and across the edges of door, window, and other openings which connect interior and exterior surfaces, said continuous surface paneling and airtight lap joints providing a highly airtight structure, and further, the space between said interior and exterior surfaces filled with a thermal insulating material.

* * * * *